US006283554B1

United States Patent
Oberg

(10) Patent No.: US 6,283,554 B1
(45) Date of Patent: Sep. 4, 2001

(54) DUMP TRUCK SYSTEMS AND METHOD

(75) Inventor: Gordon D. Oberg, Arlington, WA (US)

(73) Assignee: Mountain Equipment, Inc., Everett, WA (US)

( * ) Notice: Subject to any disclaimer, the term of this patent is extended or adjusted under 35 U.S.C. 154(b) by 0 days.

(21) Appl. No.: 09/482,973

(22) Filed: Jan. 12, 2000

Related U.S. Application Data

(60) Provisional application No. 60/115,697, filed on Jan. 12, 1999.

(51) Int. Cl.$^7$ ........................................................ B60P 1/16
(52) U.S. Cl. ...................... 298/8 T; 298/17 S; 298/22 R
(58) Field of Search .................... 298/8 T, 17 S, 298/17.6, 22 R

(56) References Cited

U.S. PATENT DOCUMENTS

| | | | |
|---|---|---|---|
| 1,749,274 | * | 3/1930 | Crisler ................................... 298/8 T |
| 3,193,329 | * | 7/1965 | Hribar, Jr. .......................... 298/22 R |
| 3,361,477 | * | 1/1968 | Pitts .................................... 298/22 R |
| 3,674,312 | * | 7/1972 | O'Rear ................................. 298/8 T |
| 3,771,829 | * | 11/1973 | Breazeale et al. .................. 298/22 R |
| 4,261,616 | * | 4/1981 | Beegle ............................... 298/17 S |
| 5,143,496 | * | 9/1992 | Smith et al. .......................... 298/8 T |
| 5,456,520 | * | 10/1995 | Adams et al. ...................... 298/22 R |
| 5,971,493 | * | 10/1999 | Robert ................................ 298/17 S |

FOREIGN PATENT DOCUMENTS

| | | | |
|---|---|---|---|
| 475334 | * | 6/1975 | (SU) ................................... 298/8 T |

OTHER PUBLICATIONS

General Trailer Company advertising materials, 1 page, no date.
K–Line Trailers Ltd. advertising materials, 1 page, no date.
Reliance advertising materials, 1 page, Jul. 2000.
Sturdy–Weld advertising materials, 6 pages, no date.
J&J Truck Bodies advertising materials, 1 page, Jul. 2000.
Columbia Body Mfg. Co. advertising materials, 1 page, Mar. 2000.
Knight Trailers Company Inc. advertising materials, 6 pages, no date.

* cited by examiner

Primary Examiner—Stephen T. Gordon
(74) Attorney, Agent, or Firm—Michael R. Schacht; Hughes & Schacht, PLLC

(57) ABSTRACT

A dump truck system comprising a vehicle, a trailer assembly on which is mounted a trailer bed, a hitch assembly for connecting the trailer assembly to the vehicle, and trailer dump assembly for pivoting the trailer bed relative to the trailer about a dump axis. Optionally, the dump truck system may comprise a tilt assembly for tilting the trailer bed relative to the trailer assembly about a tilt axis, where the tilt axis is substantially perpendicular to the dump axis. The trailer assembly optionally comprises a trailer frame assembly, a tube member pivotally connected to the trailer frame assembly, and a suspension assembly arranged between the tube assembly and the trailer frame assembly to resiliently oppose transmission of shocks from the trailer frame assembly to the vehicle. The trailer assembly optionally comprises a trailer frame assembly, a support tube member attached to the trailer frame assembly, a slide tube member that extends through and is supported by the support tube member. In this case, the slide tube member moves relative to the support tube member between a retracted position and an extended position.

12 Claims, 6 Drawing Sheets

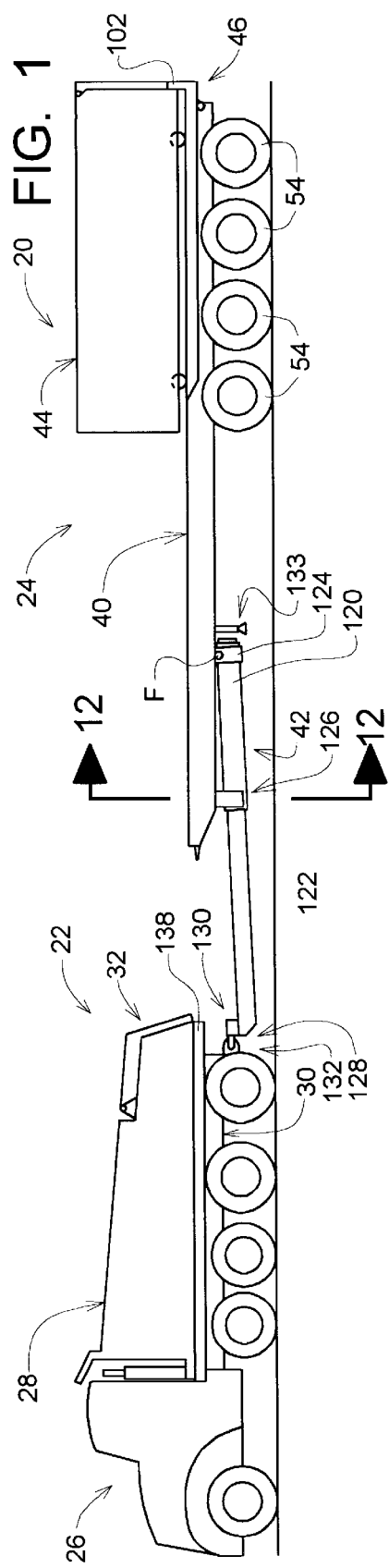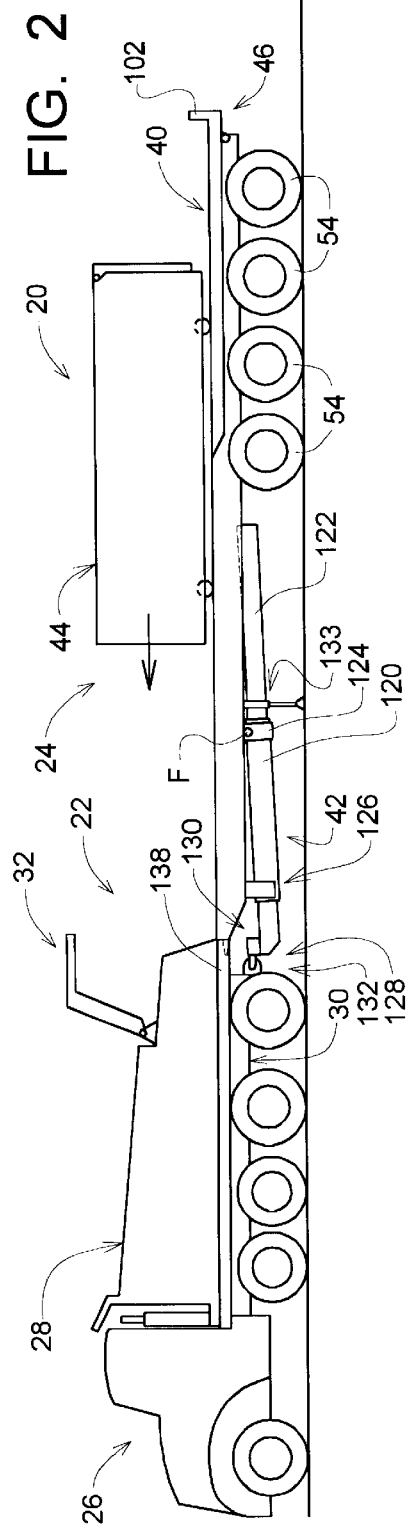

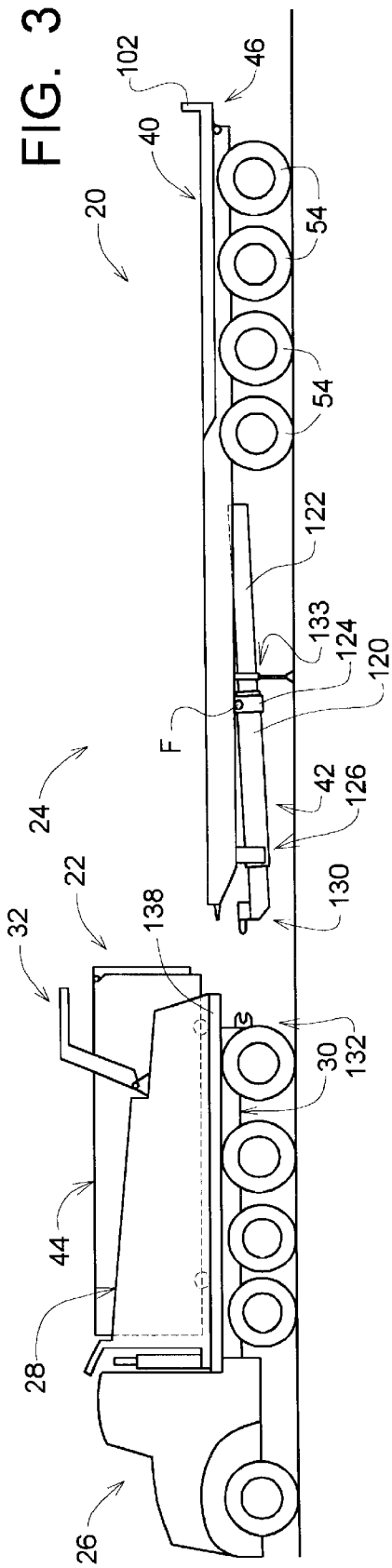
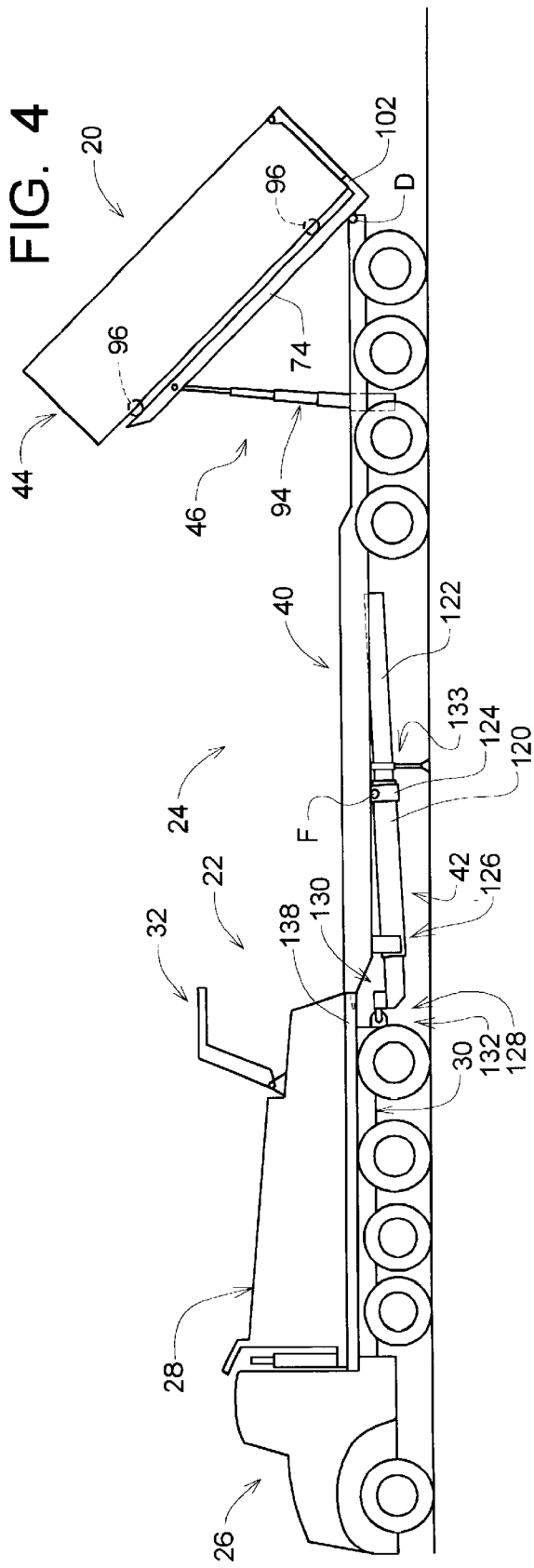

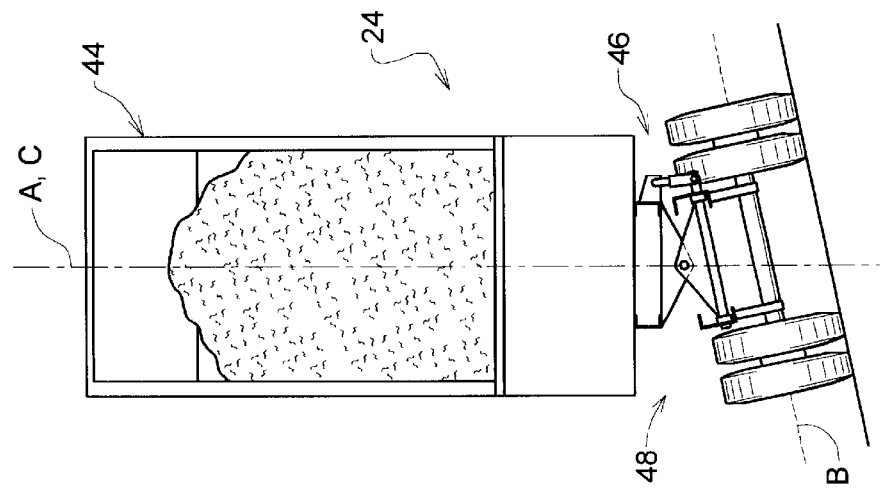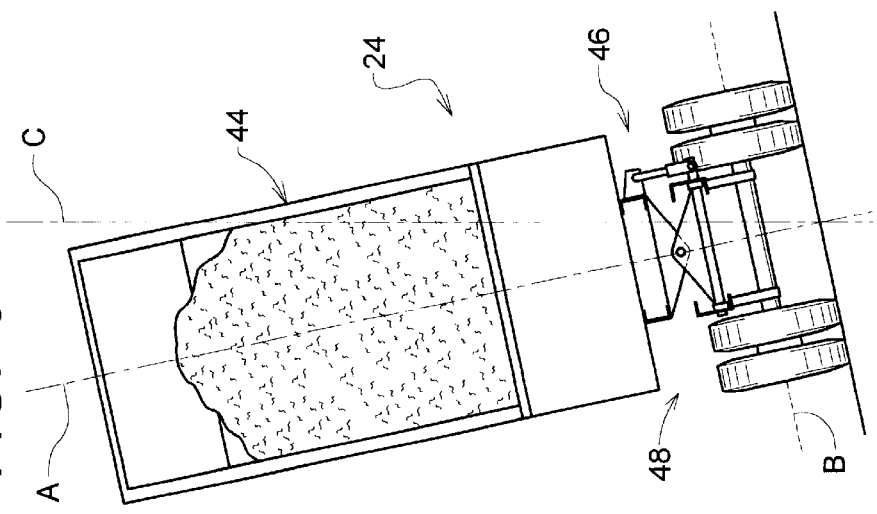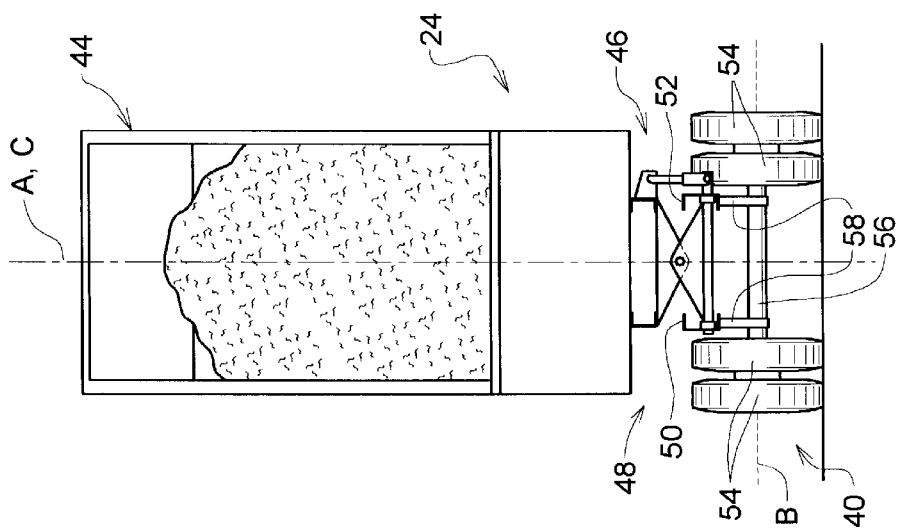

DUMP TRUCK SYSTEMS AND METHOD

RELATED APPLICATIONS

This application claims priority of U.S. Provisional Patent Application Ser. No. 60/115,697, which was filed on Jan. 12, 1999.

TECHNICAL FIELD

The present invention relates to systems and methods for loading, transporting, and dumping bulk materials and, more specifically, to such systems and methods adapted to transport bulk materials over roadways and load and dump these materials at desired locations.

BACKGROUND OF THE INVENTION

During construction products, bulk materials such as dirt, gravel, and the like must be removed and deposited at the construction site. For example, often dirt must be removed from a site during excavation for a foundation. Gravel is then often dumped at the site and compacted to form a stable substrate for the foundation.

Conventionally, dump trucks are used to remove the dirt and deposit the gravel at the site. Dump trucks are high capacity vehicles that have a truck bed that may be tilted to dump the contents from the bed quickly and efficiently. In the example give, a loader would commonly be used to load dirt onto the truck during the excavation process. The truck will then take the dirt to a dumping location where the excavated dirt is to be deposited. The truck will then dump the excavated dirt at the dumping location. Gravel will normally be loaded onto the truck by an overhead conveyor or hopper. The truck will then take the gravel to the construction site and dump the gravel at the desired location.

To improve efficiency, dump trucks often tow a trailer that supports what will be referred to as a trailer bed. The trailer bed allows the truck to transport approximately twice the amount of dirt or gravel as a truck without a trailer bed. Conventionally, the trailer bed is loaded while on the trailer and dumped by transferring the trailer bed to the truck bed and then tilting the truck bed as described above.

The need exists for improved dump truck systems and methods that may be easily loaded and unloaded and can carry large loads during each trip.

The term "bulk material" will be used herein to refer to any material that may be loaded onto, transported by, and dumped from a dump truck of the kind to which the present invention relates. The term "desired location" will be used to refer to the precise point at which material is to be deposited, while the term "transfer site" will be used to refer more broadly to the general area surrounding the desired location.

SUMMARY OF THE INVENTION

A dump truck system comprising a vehicle, a trailer assembly on which is mounted a trailer bed, hitch means for connecting the trailer assembly to the vehicle, and trailer dump means for pivoting the trailer bed relative to the trailer about a dump axis. The trailer dump means allows bulk material within the trailer bed to be dumped directly from the trailer without transferring the trailer bed to the dump truck bed.

Optionally, the dump truck system may comprise a tilt assembly for tilting the trailer bed relative to the trailer assembly about a tilt axis, where the tilt axis is substantially parallel to the dump axis. The tilt assembly allows the operator to stabilize the dump truck system prior to raising the trailer bed using the trailer dump means.

The trailer assembly optionally comprises a trailer frame assembly, a tube member pivotally connected to the trailer frame assembly, and a suspension assembly arranged between the tube means and the trailer frame assembly to resiliently oppose transmission of shocks from the trailer frame assembly to the vehicle. The suspension assembly helps to absorb shock that would otherwise be transmitted to the truck.

The trailer assembly may optionally comprise a trailer frame assembly, a support tube member attached to the trailer frame assembly, a slide tube member that extends through and is supported by the support tube member. In this case, the slide tube member moves relative to the support tube member between a retracted position and an extended position. This facilitates transfer of the trailer bed to the truck bed and/or the use of the trailer dump assembly.

BRIEF DESCRIPTION OF THE DRAWINGS

FIGS. 1–4 are side elevation views depicting the use of the dump truck systems and methods of the present invention;

FIGS. 5–7 are rear elevation views depicting the dump truck systems and methods as depicted in FIG. 4 under various terrain conditions;

DETAILED DESCRIPTION OF THE INVENTION

Figure 8:
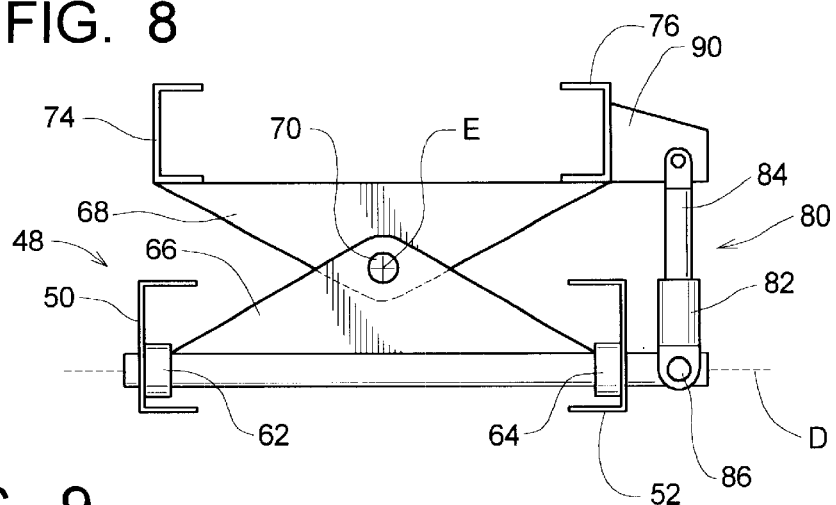
FIG. 8 is an enlarged rear elevation view depicting a leveling system that may be employed by the dump truck systems and methods of FIGS. 1–7.

Referring initially to FIGS. 1–4 of the drawing depicted at 20 therein is a dump truck system constructed in accordance with, and embodying, the principles of the present invention. These FIGS. 1–4 also depict methods of using the system 20 embodying the principles of the present invention.

The present invention is of particular significance, and that application will be described in detail herein. However, many of the features of the present invention can be applied to other types of trucks, such as logging trucks. The following discussion is thus not intended to limit the scope of the invention to only environments in which the invention is used on improved dump trucks.

The exemplary dump truck system 20 employs a dump truck 22 and a trailer assembly 24. The dump truck system 22 employs a vehicle portion 26 and a truck bed 28. The dump truck 22 is generally conventional and will be described herein only to the extent necessary for complete understanding of the present invention.

Figure 9:
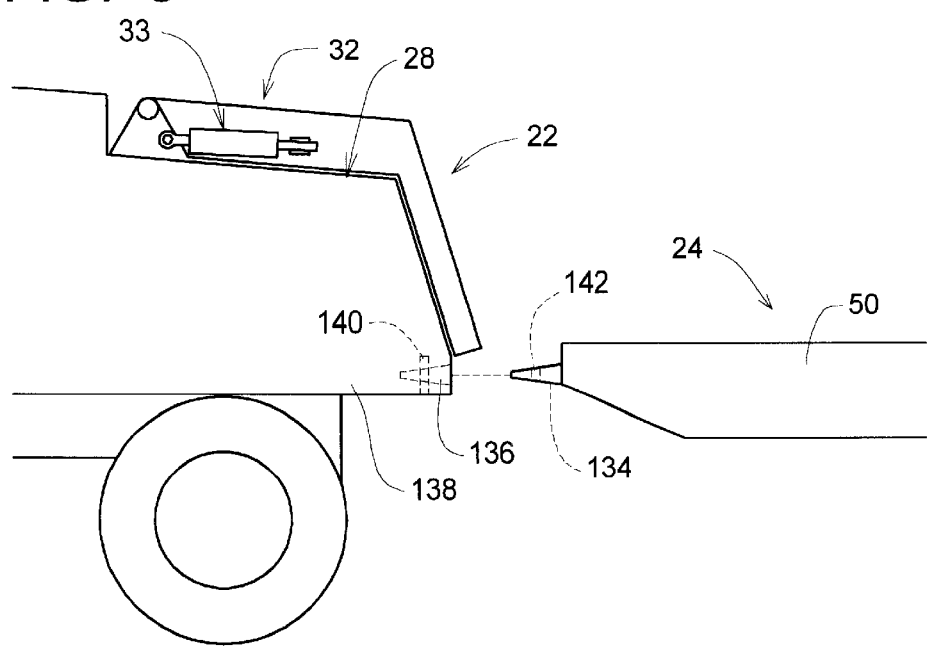
FIG. 9 is a side elevation view depicting the connection of the trailer and the dump truck as depicted in FIG. 2.

The vehicle portion 26 comprises a vehicle frame assembly 30 that supports the truck bed 28. The truck bed 28 comprises a bed gate assembly 32. The bed gate assembly 32 may be moved between a closed position (FIGS. 1 and 4) and an open position (FIGS. 2 and 3) using a gate actuator assembly 33 (FIG. 9).

The trailer assembly 24 comprises a trailer frame assembly 40, a hitch assembly 42, a trailer bed 44, a trailer dump assembly 46, and a trailer tilt assembly 48.

The dump truck system 20 may operate in any one of a number of configurations depending on the circumstances. In FIG. 1, the dump truck system 20 is shown in a transportation and loading configuration. In this first configuration, bulk material is loaded into the truck bed 28 and/or trailer bed 44. Bulk material in these beds 28 and 44 may be moved from a source point to a destination point by operation of the vehicle 26.

In FIGS. 2 and 3, the dump truck system 20 is shown in a second configuration in which the trailer bed 44 is loaded into the truck bed 28, after which the trailer assembly 24 is detached from the dump truck 22. A conventional winch system (not shown) may be used to transfer the trailer bed 44 to the truck bed. The dump truck 22 may then be used to dump material from the trailer bed 44 in a conventional manner. This second configuration would be primarily used in situations in which use of the trailer assembly 24 is not practical.

Referring now to FIG. 4, depicted therein is a third configuration in which the trailer bed 44 is dumped directly from the trailer assembly 24 using the trailer dump assembly 46. This third configuration is used in situations where the trailer assembly 24 may be maneuvered into position at the desired location where the bulk material is to be dumped. If the trailer assembly 24 can be maneuvered such that this third configuration is possible, the bulk material contained in the trailer bed 44 may be dumped more quickly and efficiently than using the second configuration described above with reference to FIGS. 2 and 3.

With the foregoing general understanding of the operation of the dump truck system 20 in mind, reference is now made to FIGS. 5–7. FIGS. 5–7 show details of operation of the trailer tilt assembly 48.

In particular, FIGS. 5 and 6 show that the trailer bed 44 defines a bed reference plane A and the trailer frame assembly 40 defines a frame reference axis B. Under most situations, the trailer bed 44 is in the down position shown in FIGS. 1–3 and the bed reference plane A is perpendicular to the trailer reference axis B.

However, FIG. 6 shows that the bed reference plane A can be substantially misaligned with a true vertical reference plane C on uneven ground. Accordingly, maintaining this perpendicular relationship between the bed reference plane A and the trailer reference axis B can cause an unstable situation on non-level ground when the trailer bed 44 is in its raised position as shown in FIG. 6.

Referring now to FIG. 7, it can be seen that on uneven ground (the trailer reference axis B is not horizontal), the trailer tilt assembly 48 is operated until the bed reference plane A is substantially parallel with the vertical reference plane C. In this case, the bed reference plane A is no longer perpendicular to the trailer reference axis B. The trailer tilt assembly 48 thus allows the trailer to be unloaded in a stable fashion on uneven ground.

Referring now to FIG. 8, the trailer tilt assembly 48 will now be described in further detail. Identified by reference characters 50 and 52 are first and second main frame members of the trailer frame assembly 40. These frame members 50 and 52 are rigid beams capable of carrying the load of the trailer bed 44 and its contents. Referring for a moment to FIG. 5, it can be seen that the main frame members 50 and 52 are supported by wheels 54 mounted on wheel axials 56 and wheel axials struts 58. The wheel axials 56 define the trailer reference axis B described above.

Referring back to FIG. 8, the dump assembly 46 comprises a dump axle 60 is mounted by dump bearings 62 and 64 to the main frame members 50 and 52. The dump axle 60 defines a dump axis D; the dump bearings 62 and 64 allow the dump axle 60 to axially rotate about the dump axis D.

The exemplary tilt assembly 48 comprises a frame flange 66, a bed flange 68, and a tilt pin 70. The frame flange 66 is rigidly attached to the dump axle 60. The frame flange 66 is connected to a bed flange 68 by a tilt pin 70. The tilt pin 70 allows the bed flange 68 to rotate about a tilt axis E relative to the frame flange 66. The bed flange 68 is in turn rigidly connected to first and second bed support members 74 and 76 that support the trailer bed 44 and its contents. The trailer bed 44 is thus supported on the trailer frame assembly 40 in a manner that lets the trailer bed 44 move in two axes of rotation; i.e., about the dump axis D and the tilt axis E relative to the trailer frame assembly 40.

The exemplary tilt axis assembly 48 further comprises a tilt actuator assembly 80 comprising an actuator housing 82 and an actuator piston 84. The actuator assembly 80 is conventional and is hydraulically operated to extend and retract the piston 84 relative to the housing 82. The housing 82 is pivotally connected to the dump axle 60 by a housing pin 86, while the actuator piston 84 is pivotally connected to a tilt flange 90 rigidly extending from the trailer bed 44. Appropriate application of hydraulic fluid to the actuator housing 82 increases and decreases the effective length of the tilt actuator assembly 80, which in turn causes the trailer be 44 to rotate about the tilt axis E as described above with reference to FIGS. 5–7.

Figure 11:
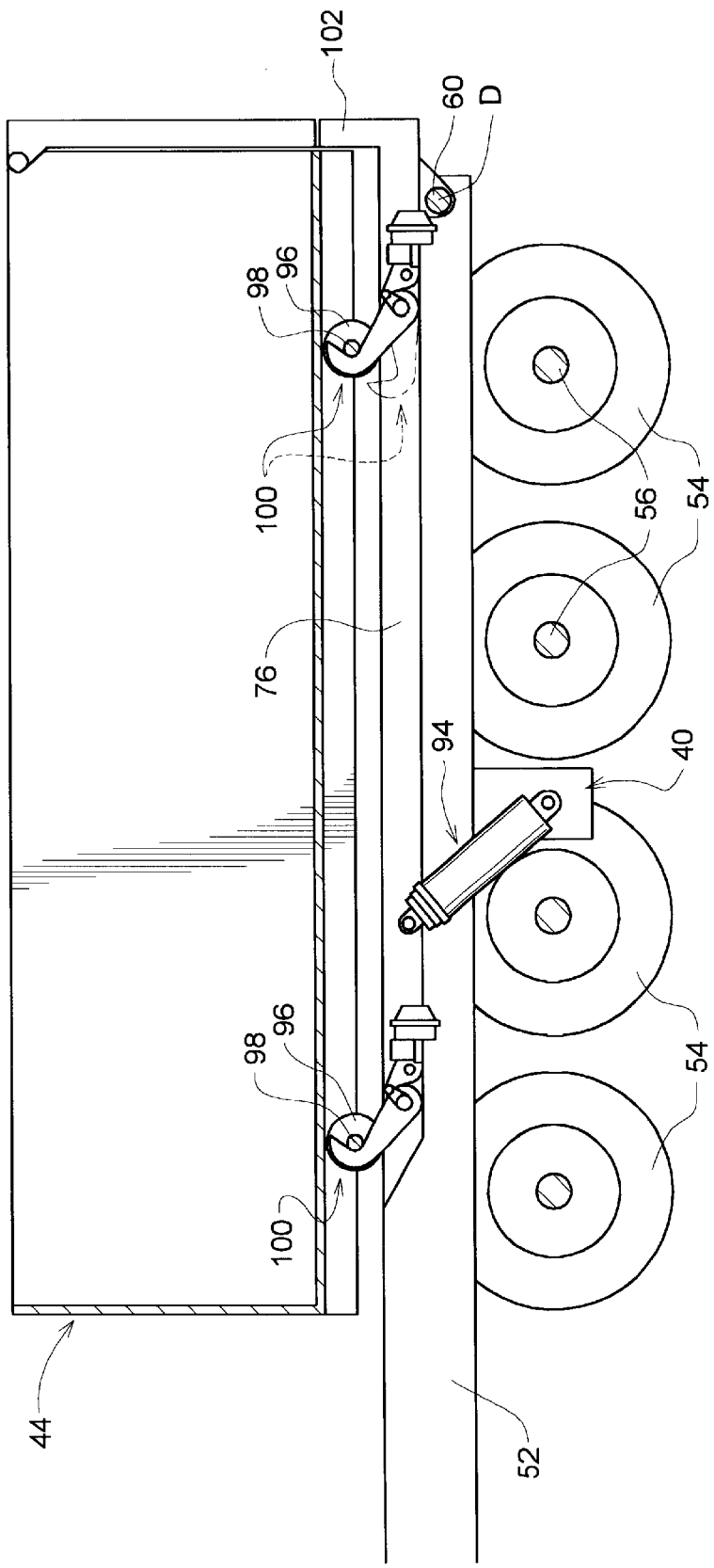
FIG. 11 is a side elevation view depicting the connection of the trailer and trailer bed of the dump truck systems and methods of FIGS. 1–7.

Referring now to FIG. 11, depicted therein is a dump actuator 94 that is pivotally connected at one end to the trailer frame assembly 40 and at another end to the trailer bed 44. The dump actuator 94 is also conventional, and appropriate application of hydraulic fluid thereto increases and/or decreases the effective length of the actuator 94 using telescoping parts (see FIG. 4). Operation of the dump actuator 94 thus allows the trailer be 44 to be rotated about the dump axis D as described above with reference to FIGS. 1–4.

FIG. 11 also depicts bed wheels 96 that are mounted to the trailer bed 44 by bed wheel axles 98. These bed wheels 96 engage the trailer frame 40 and allow the trailer bed 44 to be moved along the trailer frame 40 as depicted in FIGS. 2 and 3 above.

FIG. 11 further depicts exemplary latch assemblies 100 that may be moved between an engaged position (solid lines) in which movement of the trailer bed 44 towards the front is prevented and a disengaged position (broken lines) in which movement of the trailer bed 44 towards the front is allowed. In the engaged positions, the latch assemblies engage the bed wheel axles, 98.

Extending upwardly from the trailer frame 40 are bed stops 102 that engage the trailer bed 44 to prevent the bed 44 from moving further towards the rear when the trailer bed 44 is in a storage/dump position as shown in FIGS. 1, 4, and 11.

Referring now to FIGS. 1–4, the exemplary hitch assembly 42 used by the system 20 will now be described in further detail. The hitch assembly 42 allows the trailer assembly 24 to be attached to and detached from the vehicle 26.

The hitch assembly 42 comprises a support tube 120, a slide tube 122, a support collar 124, and a suspension system 126. The support collar 124 is rigidly attached to the trailer frame 40; the support collar 24 also pivotally suspends the support tube 120 from the trailer frame 40 such that the support tube 120 rotates relative to the trailer frame 40 about a suspension axis F. The slide tube 122 is slidably supported by the support tube 124 such that the slide tube 122 moves between an extended position (FIG. 1) and a retracted position (FIGS. 2–4). The suspension system 126 is mounted between the support tube 120 and the trailer frame 40 to resiliently oppose movement of the support tube 120 towards the trailer frame 40. A hitch assembly 128 is formed by a tongue assembly 130 and a receiver assembly 132. The tongue assembly 130 is rigidly connected to the slide tube 120, while the receiver assembly 132 is rigidly connected to the vehicle 26. The tongue assembly 130 is adapted to be detachably attached to the receiver assembly 132 in a conventional manner. The hitch assembly 128 is thus generally conventional and allows the slide tube 122 to be rigidly connected to and detached from the vehicle 26. A jack assembly 133 is rigidly connected to the trailer frame 40 to support the trailer assembly 24 when the trailer assembly 24 is detached from the vehicle 26.

Figure 10:
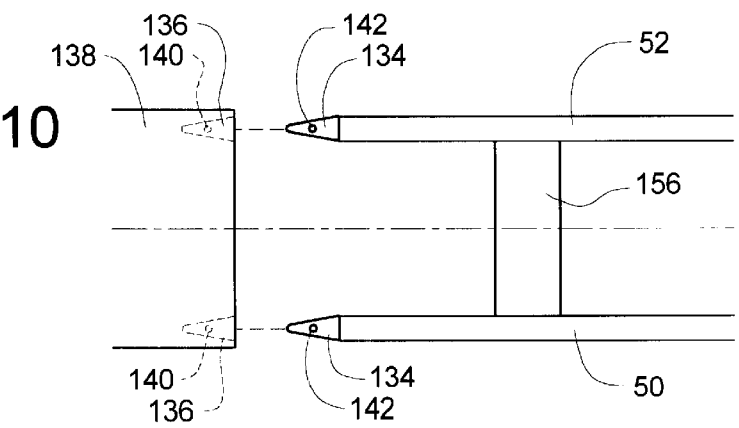
FIG. 10 is a top plan view depicting the situation shown in FIG. 9.

Referring now to FIGS. 9 and 10, depicted therein are lock projections 134 and lock cavities 136 that allow the trailer frame 40 to be directly supported by a structural, portion 138 of the vehicle frame assembly 30. The lock projections 134 are formed on the main frame members 50 and 52. The lock cavities 136 are formed in the structural portion 138 of the trailer frame 40. The lock cavities 136 are sized and dimensioned to snugly receive the lock projections 134 such that movement of the main frame members 50 and 52 up, down, sideways, or towards the vehicle 26 is substantially prevented. Optionally, lock pins 140 may be passed through lock holes 142 in the lock projections 134 to prevent withdrawal of the lock projections 134 from the lock cavities 136 under normal use.

The lock projections 134 and lock cavities 136 allow the trailer assembly 24 to be secured to the vehicle assembly 26 during the second and third configurations of used shown in FIGS. 2–4.

Figure 12:
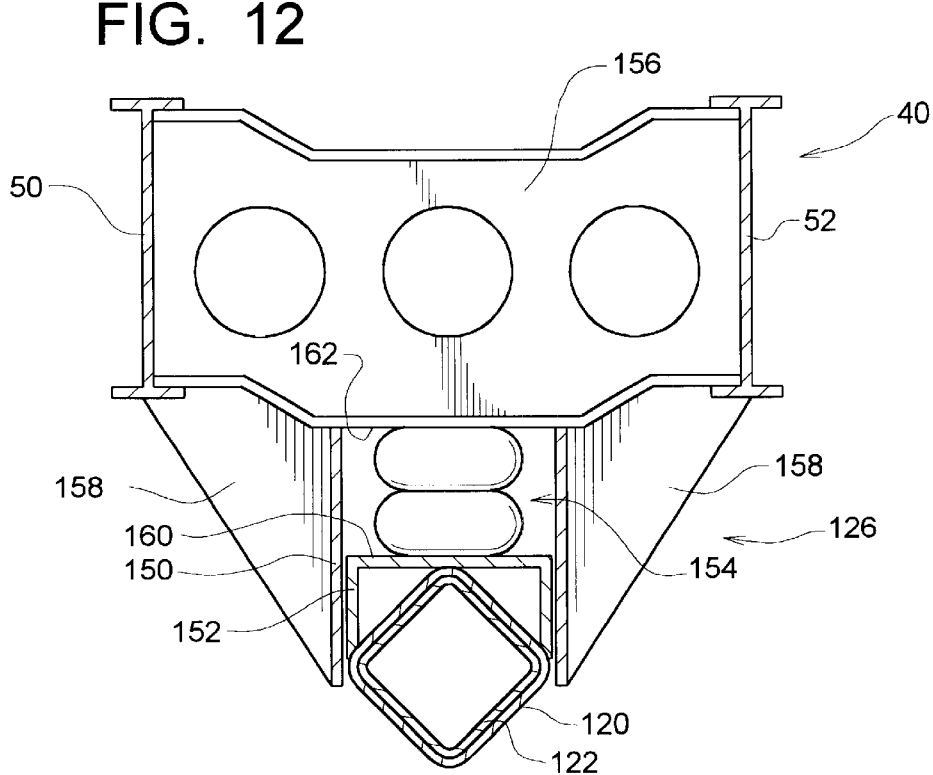
FIG. 12 is a section view taken along lines 12—12 in FIG. 1 depicting a suspension system that may be employed by the dump truck systems and methods of FIGS. 1–7.
Figure 13:
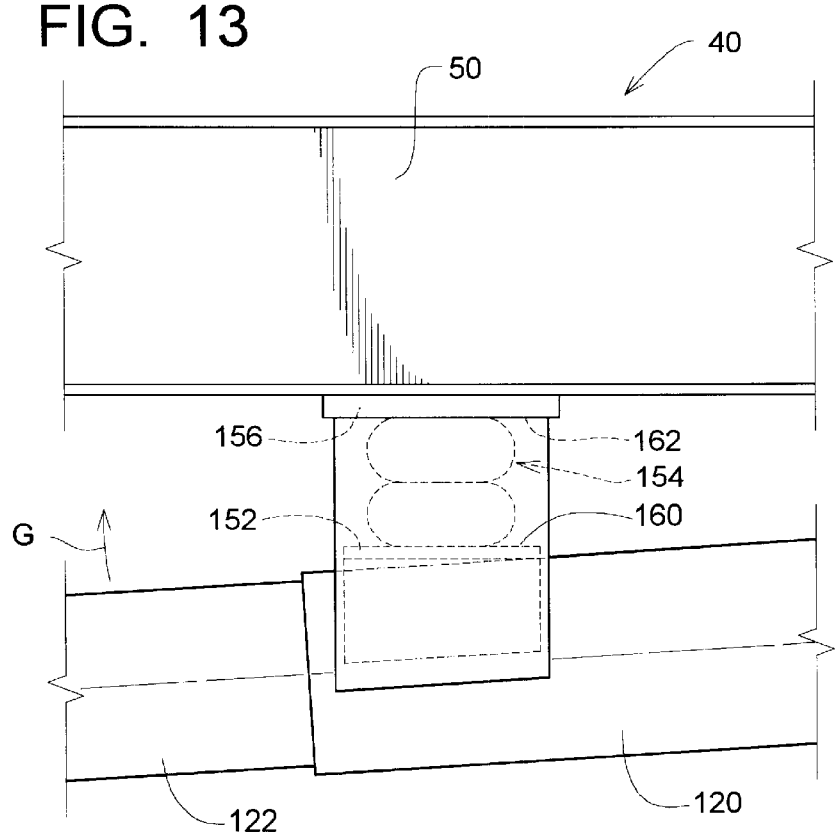
FIG. 13 is a side elevation view depicting details of the suspension system of FIG. 12.

Referring now to FIGS. 12 and 13, the optional suspension system 126 will now be described in further detail. The suspension system 126 comprises a suspension housing 150, a suspension bracket 152, and an air bag system 154. The suspension housing 150 is rigidly connected to a cross member 156 that extends between the main frame members 50 and 52 and forms a part of the trailer frame assembly 40. Brace members 158 further rigidly connect the suspension housing 150 to the trailer frame 40.

The suspension bracket 152 is rigidly attached to the support tube 120 such that the bracket 152 is substantially contained within the suspension housing 150 with a bracket surface 160 on the suspension bracket 152 facing a housing surface 162 on the cross member 156. The air bag system 154 is contained within the suspension housing 150 between the bracket surface 160 and the housing surface 162.

The air bag system 154 is conventional and, when inflated, resiliently opposes movement of the bracket surface 160 towards the housing surface 162. As described above, the support tube 120 is pivotally connected to the trailer frame 40 by the support collar 124. This pivotal connection allows the support tube 120 to pivot in the direction shown by arrow G in FIG. 13 relative to the trailer frame 40. The air bag system 154 will resiliently oppose movement in the direction shown by arrow G.

Accordingly, in the first configuration shown in FIG. 1, with the slide tube 122 in the extended position and the trailer assembly 24 connected to the vehicle 26, the suspension system 126 will inhibit transmission of shocks from the moving trailer assembly 24 to the vehicle 26. The air bag system 154 may be inflated and/or deflated in the second and third configurations shown in FIGS. 2–4 as necessary to facilitate connection of the tongue assembly 130 to the hitch assembly 128 and/or insertion of the lock projections 134 into the lock cavities 136.

From the foregoing, it should be apparent that the present invention may be embodied in forms other than those described above. The scope of the present invention should thus be determined by the following claims and not the foregoing detailed description.

What is claimed is:

1. A dump truck system comprising:

a vehicle comprising a vehicle bed;

a trailer assembly on which is mounted a trailer bed, the trailer assembly comprising a trailer frame along which the trailer bed moves;

hitch means for connecting the trailer assembly to the vehicle; and trailer dump means for pivoting the trailer bed relative to the trailer assembly about a dump axis; wherein the hitch means allows the trailer frame to be in a first position in which the trailer frame does not engage the vehicle bed and a second position in which the trailer frame engages the vehicle bed to allow the trailer bed to transfer from the trailer assembly to the vehicle bed.

2. A dump truck system as recited in claim 1, further comprising a tilt assembly for tilting the trailer bed relative to the trailer assembly about a tilt axis, where the tilt axis is substantially perpendicular to the dump axis.

3. A dump truck system as recited in claim 1, in which the trailer assembly further comprises:

a support tube member pivotally connected to the trailer frame, where the hitch means attaches the support tube member to the vehicle; and a suspension assembly arranged between the support tube member and the trailer frame to resiliently oppose transmission of shocks from the trailer frame to the vehicle.

4. A dump truck system as recited in claim 1, in which the trailer assembly further comprises:

a support tube member attached to the trailer frame;

a slide tube member that extends through and is supported by the support tube member, where the hitch means attaches the slide tube member to the vehicle; wherein the slide tube member moves relative to the support tube member between a retracted position and an extended position.

5. A dump truck system as recited in claim 3, in which the trailer assembly further comprises:

a slide tube member that extends through and is supported by the support tube member, where the hitch means attaches the slide tube member to the vehicle; wherein the slide tube member moves relative to the support tube member between a retracted position and an extended position.

6. A dump truck system as recited in claim 4, in which the slide tube member is in the extended position when the trailer frame is in the first position and the slide tube member is in the retracted position when the trailer frame is in the second position.

7. A dump truck system as recited in claim 5, in which the slide tube member is in the extended position when the trailer frame is in the first position and the slide tube member is in the retracted position when the trailer frame is in the second position.

8. A dump truck system comprising:
   a vehicle;
      a trailer assembly on which is mounted a trailer bed;
   hitch means for connecting the trailer assembly to the vehicle; and
   trailer dump means for pivoting the trailer bed relative to the trailer assembly about a dump axis; wherein
   the trailer assembly comprises
      a trailer frame assembly,
      a tube member pivotally connected to the trailer frame assembly, where the hitch means attaches the tube member to the vehicle, and
      a suspension assembly arranged between the tube member and the trailer frame assembly to resiliently oppose transmission of shocks from the trailer frame assembly to the vehicle.

9. A dump truck system as recited in claim 8, further comprising a tilt assembly for tilting the trailer bed relative to the trailer assembly about a tilt axis, where the tilt axis is substantially perpendicular to the dump axis.

10. A dump truck system as recited in claim 8, in which the trailer assembly further comprises:
   a support tube member attached to the trailer frame assembly;
   a slide tube member that extends through and is supported by the support tube member, where the hitch means attaches the slide tube member to the vehicle; wherein
   the slide tube member moves relative to the support tube member between a retracted position and an extended position.

11. A dump truck system comprising:
   a vehicle;
      a trailer assembly on which is mounted a trailer bed;
   hitch means for connecting the trailer assembly to the vehicle; and
   trailer dump means for pivoting the trailer bed relative to the trailer assembly about a dump axis; wherein
   the trailer assembly comprises
      a trailer frame,
      a support tube member attached to the trailer frame,
      a slide tube member that extends through and is supported by the support tube member, where the hitch means attaches the slide tube member to the vehicle, where
      the slide tube member moves relative to the support tube member between a retracted position and an extended position.

12. A dump truck system as recited in claim 11, in which the support tube member is pivotally connected to the trailer frame and the hitch means attaches the support tube member to the vehicle, the trailer assembly further comprising a suspension assembly arranged between the support tube member and the trailer frame to resiliently oppose transmission of shocks from the trailer frame to the vehicle.

\* \* \* \* \*